(12) United States Patent
Komori et al.

(10) Patent No.: US 7,755,771 B2
(45) Date of Patent: Jul. 13, 2010

(54) NONCONTACT METHOD FOR MEASURING PITCH OF GEAR TEETH AND SCREW

(75) Inventors: Masaharu Komori, Kyoto (JP); Aizoh Kubo, Kyoto (JP); Yoshihiro Oda, Kyoto (JP)

(73) Assignee: Kyoto University, Kyoto-Shi, Kyoto-Fu (JP)

( * ) Notice: Subject to any disclaimer, the term of this patent is extended or adjusted under 35 U.S.C. 154(b) by 585 days.

(21) Appl. No.: 11/662,421

(22) PCT Filed: Sep. 6, 2005

(86) PCT No.: PCT/JP2005/016289

§ 371 (c)(1),
(2), (4) Date: Mar. 9, 2007

(87) PCT Pub. No.: WO2006/030664

PCT Pub. Date: Mar. 23, 2006

(65) Prior Publication Data

US 2007/0291260 A1   Dec. 20, 2007

(30) Foreign Application Priority Data

Sep. 13, 2004  (JP) .............................. 2004-265478

(51) Int. Cl.
*G01B 11/24* (2006.01)
(52) U.S. Cl. ...................................... 356/601; 356/620
(58) Field of Classification Search ................. 356/601, 356/609, 620–622, 635, 636
See application file for complete search history.

(56) References Cited

U.S. PATENT DOCUMENTS

| | | | |
|---|---|---|---|
| 4,547,674 A | 10/1985 | Pryor et al. | |
| 5,712,706 A * | 1/1998 | Castore et al. | 356/394 |

FOREIGN PATENT DOCUMENTS

| | | |
|---|---|---|
| DE | 199 41 771 A1 | 3/2001 |
| JP | S64-053105 | 3/1989 |
| JP | H01-285807 | 11/1989 |
| JP | H04-236311 | 8/1992 |
| JP | 2002-107142 | 4/2002 |
| JP | 2004-012134 | 1/2004 |

* cited by examiner

*Primary Examiner*—L. G Lauchman
(74) *Attorney, Agent, or Firm*—Manabu Kanesaka

(57) ABSTRACT

A pitch measurement method of performing noncontact measurement of a pitch of target portions, the target portions being provided in an object and adjacent to each other, includes moving the object such that the target portions move along a same path, continuously acquiring and storing optical data of the target portions passing a predetermined position on the path from a fixed position, while focusing on the predetermined position, calculating a focusing evaluation value representing a degree of focus at an area corresponding to the predetermined position, using a movement distance of the target portions as a variable, according to a relationship between the optical data and the movement distance, and obtaining a point group of combinations of the movement distance and the focusing evaluation value, and applying a reference curve to the point group, thereby determining the pitch based on a position where the reference curve is applied.

12 Claims, 11 Drawing Sheets

MEASUREMENT SURFACE MOVEMENT DISTANCE (μm)

(a)

(b)

TOOTH NO.

| 1 | 1 | 1 |
|---|---|---|
| 1 | -8 | 1 |
| 1 | 1 | 1 |

(a)

| -1 | 0 | 1 |
|---|---|---|
| -1 | 0 | 1 |
| -1 | 0 | 1 |

(b)

| -1 | -1 | -1 |
|---|---|---|
| 0 | 0 | 0 |
| 1 | 1 | 1 |

(a)

(b)

NONCONTACT METHOD FOR MEASURING PITCH OF GEAR TEETH AND SCREW

TECHNICAL FIELD

The present invention relates to a pitch measuring method for executing noncontact measurement of a pitch of gear teeth or a screw.

BACKGROUND ART

Mechanical parts such as a gear have to undergo a pitch measurement from the perspective of quality control, because a pitch error in microns may provoke vibration or noise of the machine.

To measure the gear pitch, a contact measurement method that utilizes a probe is primarily employed (for example, refer to Patented Document 1). Noncontact measurement methods include an optical distance measurement method.

[Patented document 1] Japanese Published Unexamined Patent Application No. 2002-107142

DISCLOSURE OF THE INVENTION

Problem to be Solved by the Invention

In the case of the contact measurement, there is a certain limit on reduction of measurement time and improvement of measurement accuracy. The noncontact measurement method has such drawbacks that securing a necessary operating distance leads to insufficient measurement accuracy, that the nature of the surface to be measured is limited, and that the environment that permits utilizing the method is limited, and is therefore almost never put to practical use for the pitch measurement.

In view of the foregoing situation, an object of the present invention is to provide a pitch measurement method that allows performing accurate noncontact measurement in a short period of time, with a simple device.

Means for Solving the Problem

To solve the foregoing problem, the present invention provides a pitch measurement method arranged as follows.

The pitch measurement method is a method for measuring the pitch of a distance between target points of adjacent shape-of-interest portions in a noncontact way, i.e. a pitch of the shape-of-interest portions, with respect to an object having a plurality of shape-of-interest portions of generally the same shape. The pitch measurement method includes first to fourth steps. In the first step, the object is moved such that the shape-of-interest portions move along the same path. In the second step, optical data of the shape-of-interest portion passing a predetermined position on the path from a fixed position is successively acquired focusing on the predetermined point, and the optical data is stored. In the third step, a focusing evaluation value, representing the numerical focusing degree at the area corresponding to the predetermined position, is calculated using the movement distance as a variable, according to the correspondence relationship between the stored optical data and a movement distance of the shape-of-interest portion of the object, and a point group of combinations of the movement distance and the focusing evaluation value is obtained. In the fourth step, a reference curve is applied to the point group, so as to determine the pitch based on the position where the reference curve is applied.

In the foregoing method, for example, the pitch between the adjacent shape-of-interest portions can be calculated, based on the position where the reference curve is applied, determined in the fourth step with respect to each shape-of-interest portion. Also, a difference between a measured value and a standard value of the pitch (pitch error) can be calculated.

The foregoing method is a noncontact type, and therefore allows performing the measurement in a shorter time than by a contact type measurement. Also, the movement and photoshooting of the object, as well as the storage and processing of the data can be executed with a simple device.

In general, in the vicinity of a peak position where the focusing evaluation value with respect to the shape-of-interest portion becomes maximum, variation amount of the focusing evaluation value is relatively small and hence a measurement error of the focusing evaluation value becomes relatively large, thereby making it difficult to accurately determine the peak position. Applying the reference curve enables reducing the influence of the measurement error around the peak position, thereby facilitating accurately determining the peak position in consideration of the overall shape of the curve of the focusing evaluation value.

Also, applying the reference curve in a smaller increment than the measurement interval of the movement distance enables determining the peak position in a smaller increment than the measurement interval of the movement distance.

Preferably, in the third step, the reference curve is determined based on the focusing evaluation value obtained before and after at least one of the shape-of-interest portions passes the predetermined position on the path.

In this case, the reference curve is determined based on the focusing evaluation value with respect to at least one of the shape-of-interest portions that have been measured. Such arrangement allows properly determining the reference curve despite fluctuation among each individual object, thereby allowing accurate determination of the pitch of the shape-of-interest portions.

For example, the curve of the focusing evaluation value with respect to the shape-of-interest portion that has been first measured is adopted as the reference curve. Alternatively, the curve of the focusing evaluation value may be determined with respect to each shape-of-interest portion of the object, so as to obtain the average of those curves and employ the average as the reference curve.

Preferably, the reference curve is a curve including a section between at least one extreme value and inflection points located on the respective sides thereof.

In this case, the position of the shape-of-interest portion can be determined based on the overall curve shape of the focusing evaluation value of the shape-of-interest portion, and influence of various noises can be reduced and the pitch measurement accuracy can be upgraded.

Preferably, in the first step, the object is moved at a generally constant velocity. In the second step, the optical data is acquired and stored at generally constant intervals.

The foregoing arrangement allows acquiring the optical data each time the shape-of-interest portion of the object moves over a generally constant distance and storing such optical data, which facilitates associating the optical data with the movement distance of the object, and simplifies the data processing. This also allows maintaining the pitch measurement accuracy at a generally constant level. For example, a pitch between teeth of a gear can be accurately measured.

The present invention also provides a pitch calculation method arranged as follows.

The pitch calculation method is a method of calculating a distance between target points of adjacent shape-of-interest portions, i.e. a pitch of the shape-of-interest portions, with respect to an object having a plurality of shape-of-interest portions of generally the same shape. The pitch calculation method includes a first step of moving the object such that the shape-of-interest portions move along the same path, and accepting an input of optical data of the shape-of-interest portion passing a predetermined position on the path from a fixed position, successively acquired focusing on the predetermined point; a second step of calculating a focusing evaluation value, representing the numerical focusing degree at the area corresponding to the predetermined position, using the movement distance as a variable, according to the correspondence relationship between the optical data accepted at the first step and a movement distance of the shape-of-interest portion of the object, and obtaining a point group of combinations of the movement distance and the focusing evaluation value; and a third step of applying a reference curve to the point group, thereby determining the pitch based on the position where the reference curve is applied.

Further, the present invention provides a program that causes a computer to execute the foregoing pitch calculation method.

Thus, the present invention provides a program that causes a computer to calculate a distance between target points of adjacent shape-of-interest portions, i.e. a pitch of the shape-of-interest portions, with respect to an object having a plurality of shape-of-interest portions of generally the same shape, including causing the computer to execute a first step of moving the object such that the shape-of-interest portions move along the same path, and accepting an input of optical data of the shape-of-interest portion passing a predetermined position on the path from a fixed position, successively acquired focusing on the predetermined point; a second step of calculating a focusing evaluation value, representing the numerical focusing degree at the area corresponding to the predetermined position, using the movement distance as a variable, according to the correspondence relationship between the optical data accepted at the first step and a movement distance of the shape-of-interest portion of the object, and obtaining a point group of combinations of the movement distance and the focusing evaluation value; and a third step of applying a reference curve to the point group, thereby determining the pitch based on the position where the reference curve is applied.

Still further, the present invention provides a pitch measurement device configured as follows.

The pitch measurement device is a device that performs noncontact measurement of a distance between target points of adjacent shape-of-interest portions, i.e. a pitch of the shape-of-interest portions, with respect to an object having a plurality of shape-of-interest portions of generally the same shape. The pitch measurement device includes a data acquisition unit that successively acquires and stores, when the object is moved such that the shape-of-interest portions move along the same path, optical data of the shape-of-interest portion passing a predetermined position on the path from a fixed position, focusing on the predetermined point; and a pitch calculation unit that calculates a focusing evaluation value, representing the numerical focusing degree at the area corresponding to the predetermined position, using the movement distance as a variable, according to the correspondence relationship between the stored optical data and a movement distance of the shape-of-interest portion of the object, obtains a point group of combinations of the movement distance and the focusing evaluation value, and applies a reference curve to the point group, thereby determining the pitch based on the position where the reference curve is applied.

In the foregoing arrangement, the object may be either forcibly moved or freely moved, for acquiring the optical data. The movement distance of the shape-of-interest portion may be calculated not only by directly measuring the movement distance of a reference point of the object, but also by calculation from a measurement result of a rotational angle of the object, or by calculation from a measurement result of a movement time of the reference point of the object.

The foregoing configuration allows determining the focused position of the shape-of-interest portion by the pitch calculation unit, after acquiring the optical data by the data acquisition unit.

Preferably, the data acquisition unit stores the optical data acquired from the free movement of the object in association with the time that the optical data is acquired. The pitch calculation unit determines the focused position based on the optical data stored by the data acquisition unit and the time associated with the optical data.

The foregoing arrangement allows calculating the movement distance of the shape-of-interest portion at the time that the optical data was acquired, based on the equation of motion of the freely moving object or actual measurement data, and hence enables measuring the pitch without driving the object to move. The foregoing arrangement eliminates, therefore, the need of a driving mechanism or the like that rotates the object at a generally constant velocity, thereby simplifying the structure of the pitch measurement device.

Effect of the Invention

The pitch measurement method, the program and the pitch measurement device according to the present invention enable performing a noncontact measurement with high accuracy in a short period of time, with a simple device.

REFERENCE NUMERALS

2 gear (object)
4 gear teeth (shape-of-interest portion)
6 predetermined position
10, 11 pitch measurement system
12 rotational driving unit
13 retaining unit
14 camera (data acquisition unit)
15 taking lens (data acquisition unit)
16, 18 main unit of measurement device (data acquisition unit, pitch calculation unit)
32 specimen member (object)
34 measurement surface (shape-of-interest portion)
36 camera
S reference curve
T reference axis
X peak position (application position)

BEST MODES FOR CARRYING OUT THE INVENTION

Hereunder, examples will be described referring to FIG. 1 to FIG. 8, as embodiments of the present invention.

First, a first example will be described referring to FIG. 1 to FIG. 4.

Figure 1:
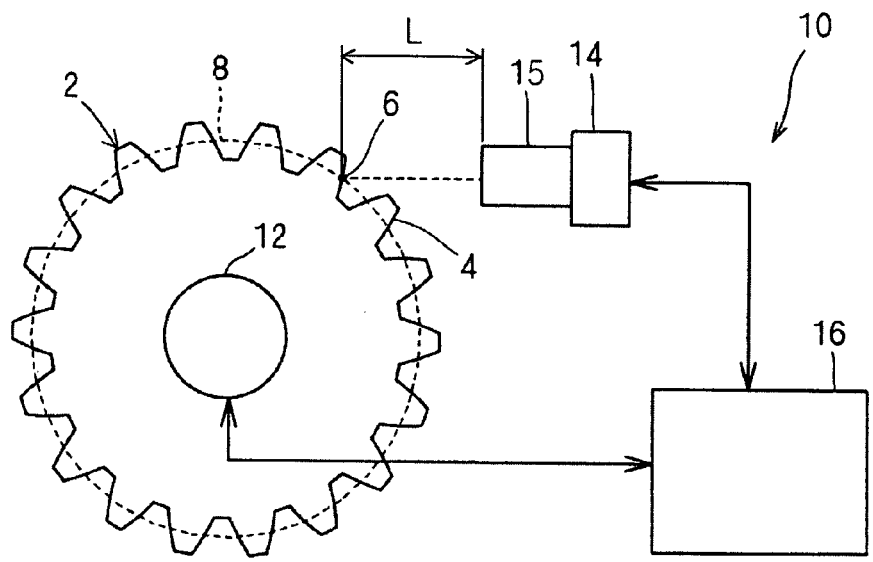
FIG. 1 is a schematic diagram of a pitch measurement system (Example 1)

FIG. 1 depicts an overall configuration of a pitch measurement system that performs the pitch measurement. A gear 2 which is the object is placed on a rotating stage (not shown), to be rotationally driven at a generally constant velocity by a rotational driving unit 12. The rotational driving unit 12 includes a rotary encoder that detects a rotation angle of the gear 2. Here, it suffices that the gear 2 smoothly rotates, if not perfectly at constant velocity, as will be described later. Also, the gear 2 may be naturally rotated instead of being forcibly rotated. In this case, the rotation angle of the gear may be calculated from time measurement.

The shape-of-interest portion is gear teeth 4 of the gear 2, and a predetermined position 6 on a path along which the teeth 4 of the gear 2 rotationally move, for example, a point on a pitch circle 8, is shot by a camera 14. The taking lens 15 of the camera 14 is set to be focused on the predetermined point 6. A camera is fixed at a position spaced from the predetermined position 6 of the taking lens 15 by a motion stroke L.

Figure 2:
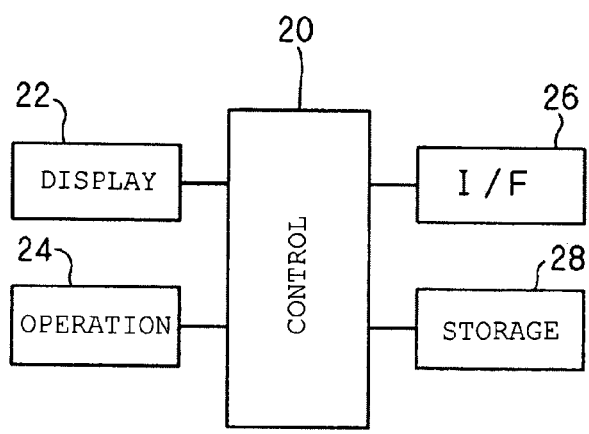
FIG. 2 is a block diagram of a main unit of a measurement device (Example 1)

The main unit of the measurement device 16 executes a predetermined program, to thereby control the rotational driving unit which rotationally drives the gear 2 and operation of the camera 14. As shown in FIG. 2, the main unit of the measurement device 16 includes a control unit 20 that governs the control, to which a display unit 22 including a display panel, an operation unit 24 including an operation panel for setting a measurement condition, starting and completing the measurement and soon, an interface 26 for making communication with the camera 14 and the rotational driving unit 12, and a storage unit 28 that stores therein data such as images shot by the camera 14, are connected. The control unit 20 includes a CPU and has an arithmetic function. The main unit of the measurement device 16 may be constituted of a general-purpose personal computer.

An operation of the measurement system 10 will now be described.

The rotational driving unit 12 rotationally drives the gear 2 at a generally constant designated velocity, based on a command signal from the main unit of the measurement device 16. The camera 14 shoots images at generally regular designated intervals, based on the command signal from the main unit of the measurement device 16. The camera 14 transmits the data of shot images to the main unit of the measurement device 16, each time the image is shot or when a certain amount of image data has been accumulated. The main unit of the measurement device 16 receives the data from the camera 14, and stores the received data in the storage unit 28. When a predetermined amount of data is stored in the storage unit 28, the main unit of the measurement device 16 transmits a command signal so as to stop the operation of the rotational driving unit 12 and the camera 14, thus completing the measurement operation.

The main unit of the measurement device 16 executes an analytic operation after completion of the measurement operation, or in parallel with the measurement operation. Specifically, the main unit of the measurement device 16 reads out the data provided by the camera 14 out of the storage unit 28, and calculates a focusing evaluation value with respect to the predetermined position 6. For example, Laplacians of luminance level of R, B, and G are respectively calculated with respect to pixels corresponding to a region close to the predetermined position 6, and the Laplacians are multiplied by an appropriate coefficient and summed, thus producing a focusing evaluation value. In this case, the focusing evaluation value represents the sharpness of the image in a numerical value.

Figure 3:
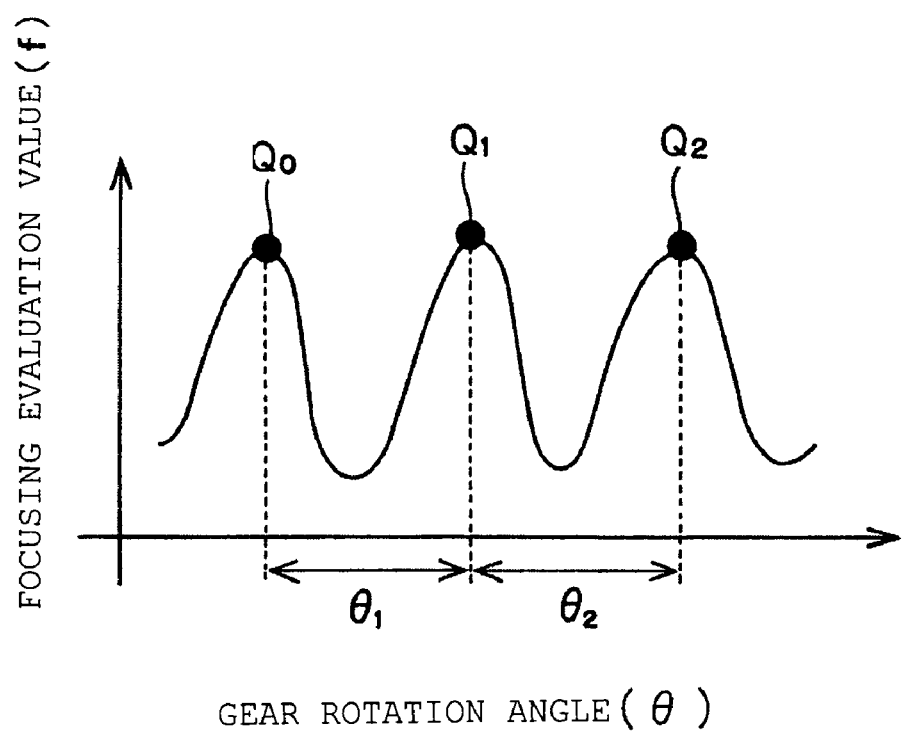
FIG. 3 is a graph of focusing evaluation values (Example 1)

As schematically shown in FIG. 3, the focusing evaluation value repeats fluctuations each time the gear tooth 4 passes the predetermined position 6 with the rotation of the gear 2. Peak positions $Q_0, Q_1, Q_2, \ldots$ of the focusing evaluation value are obtained, and thereby a difference in rotation angle between the adjacent peak positions, i.e. the pitch $\theta_1, \theta_2, \theta_3, \ldots$ are calculated.

The peak position of the focusing evaluation value (focused position) may be calculated, for example, as follows.

Figure 4:
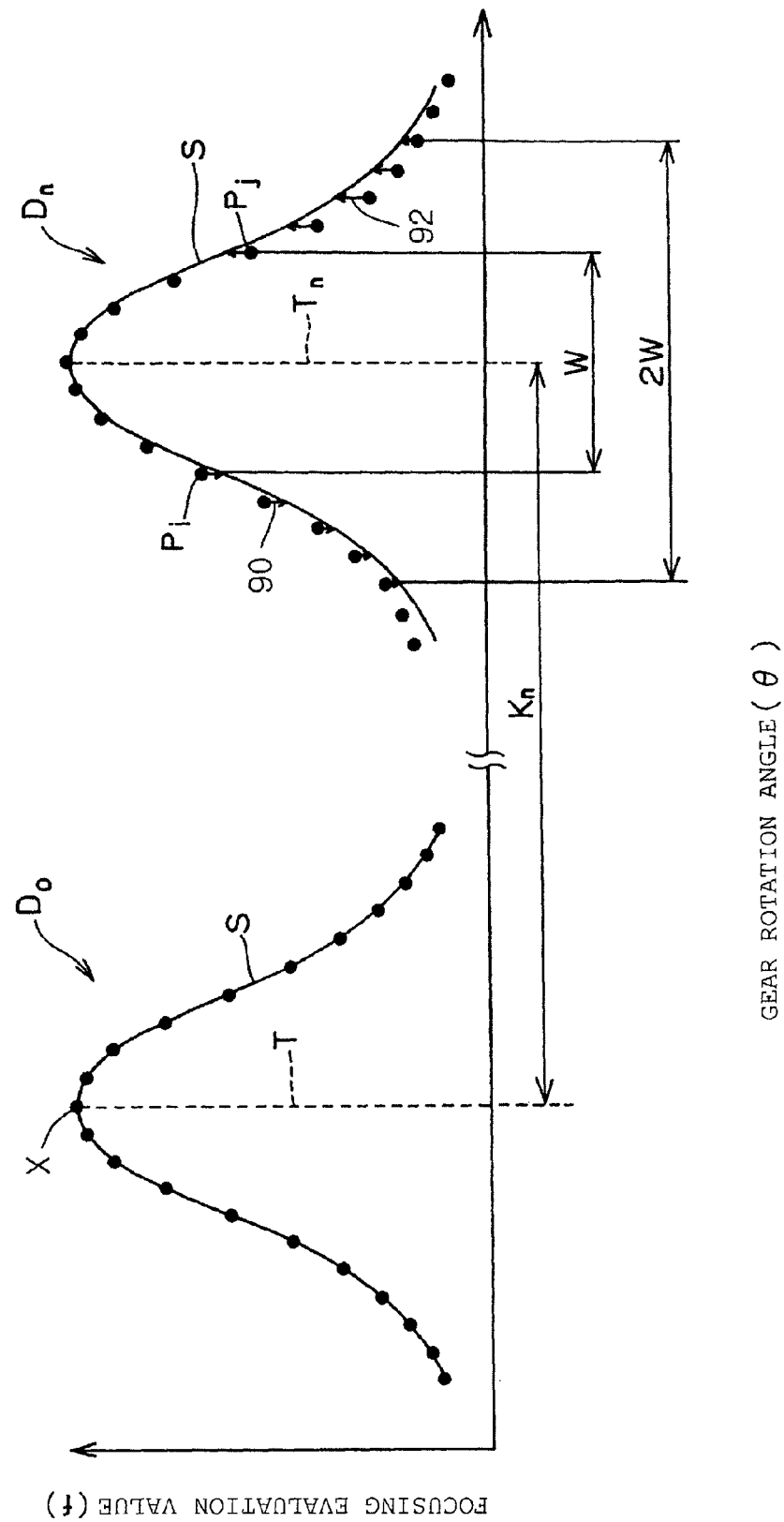
FIG. 4 is a graph for explaining application of a reference curve (Example 1)

First, as shown in FIG. 4, a reference curve S and a reference axis T corresponding to the peak position X of the reference curve are determined.

For example, a reference curve S representing the average of each point group of the focusing evaluation value with respect to each tooth profile of the gear may be employed. In this case, the average may be calculated by an appropriate method. For example, with a horizontal axis representing the rotation angle and a vertical axis representing the focusing evaluation value, an interpolating curve is obtained with respect to a point group of a specific tooth profile, and a sum of squares of the difference of each point in the point group, with respect to the interpolating curve of the point group of the specific tooth profile along the vertical axis, is obtained while moving the point groups of other teeth along the horizontal axis, and then the point group is moved to a position where the sum of squares becomes a minimum value. With respect to each point group of the teeth other than the specific tooth profile and the point group of the specific tooth profile thus moved, the corresponding points are averaged, and an interpolating curve that interpolates between the averaged points, or an approximating curve that approximates the averaged points is adopted as the reference curve S.

Alternatively, the interpolating curve or the approximating curve may be obtained only from a point group of one tooth profile as a reference, so as to adopt such curve as the reference curve S to thereby determine the peak position X and the reference axis T.

Then the reference curve S is applied to a group of data $D_n$ representing the focusing evaluation value of a given tooth, and the rotation angle of the gear corresponding to the reference axis $T_n$ where the reference curve S fits best (for example, the angle $K_n$ from the reference axis T obtained with respect to the point group $D_0$ of the focusing evaluation value of the reference tooth profile) is calculated.

For example, the reference curve S is moved in a small increment, to thereby calculate a sum of squares of a deviation between each point of the point group $D_n$ of the focusing evaluation value and the focusing evaluation value of the reference curve S (deviation in a vertical direction indicated by arrows in FIG. 4) at the position of the respective reference curve S. Then the rotation angle of the gear, corresponding to the reference axis $T_n$ at the position of the reference curve S where the sum of squares of the gaps becomes a minimum value, is obtained.

The reference curve S is to be applied at least to a section W between inflection points $P_i$, $P_j$ of the curve of the focusing evaluation value, and preferably to the data of each point included in a section of approximately a double width (2W). This allows determining the position of the reference axis from the overall curve shape of the focusing evaluation value, thereby reducing influence of noise and upgrading the accuracy of the pitch measurement.

The pitch measurement system 10 does not have to perform a synchronized drive control as with a teeth profile measurement device, and hence the structure can be simplified. Also, because of the noncontact measurement, it takes a shorter time for the measurement. Further, the pitch measurement system 10 allows setting the motion stroke L of the camera 14 in a practical range (approx. 50 mm), thereby measuring the teeth pitch with an accuracy level of 1 μm or finer.

Referring now to FIG. 5 to FIG. 8, description will be given hereunder on a basic experiment (Example 2) executed for verifying that the foregoing measurement accuracy can be achieved.

Figure 5:
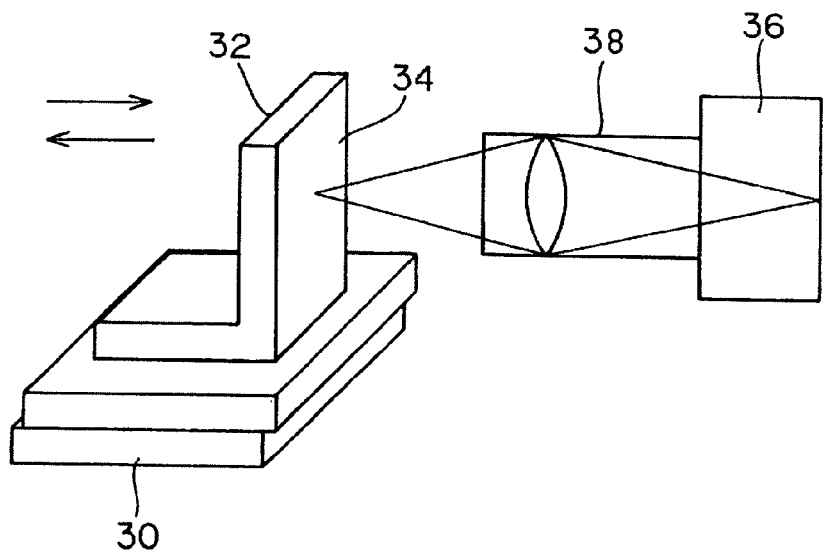
FIG. 5 is a schematic diagram for explaining a basic experiment (Example 1)

As shown in FIG. 5, a specimen member 32 having a vertical measurement surface 34 is fixed on a linear table 30, and a camera 36 is set to shoot the measurement surface 34 in a perpendicular direction. The focus of the taking lens 38 of the camera 36 is locked such that the measurement surface is focused when located at a reference position. The focal length of the taking lens 38 is 55 mm.

While the linear table 30 is moved thus to move the measurement surface 34, the camera 36 shoots images and the image data is stored in association with the position of the measurement surface 34. The identical measurement surface 34 is repeatedly measured 10 times. After the measurement, the focusing evaluation value is calculated from the first data and the reference curve is determined. Then the focusing evaluation value is calculated from the second and the subsequent data, and the reference curve is applied to thereby calculate the peak position (focused position) of the curve of the focusing evaluation value. For this process, the reference curve is applied to a range twice as wide as the section between the inflection points of the curve of the focusing evaluation value. As a result, the fluctuation in measurement value of the focused position is ±0.3 μm.

Figure 6:
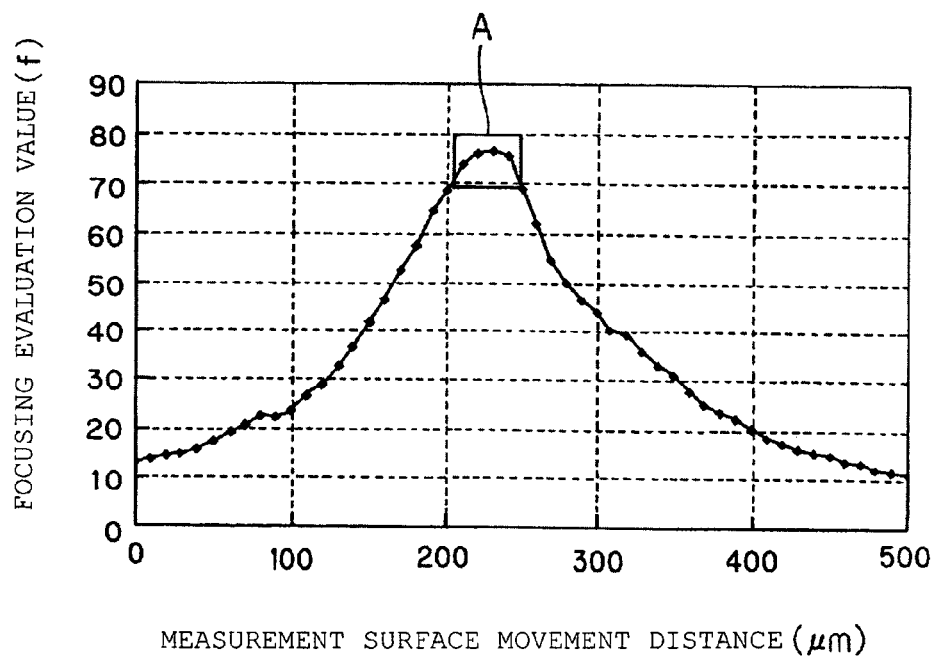
FIG. 6 is a graph of focusing evaluation values (Example 2)
Figure 7:
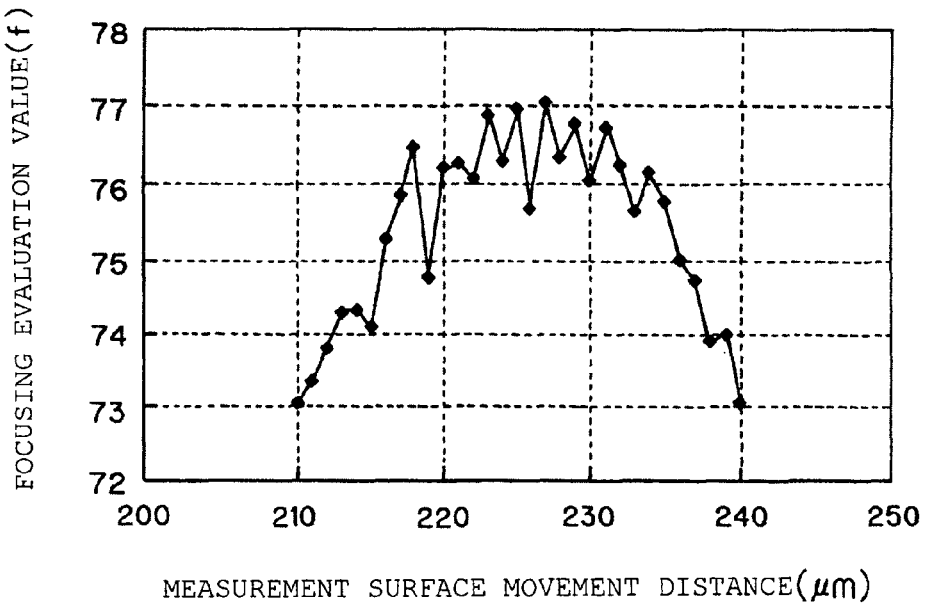
FIG. 7 is another graph of focusing evaluation values (Example 2)
Figure 8:
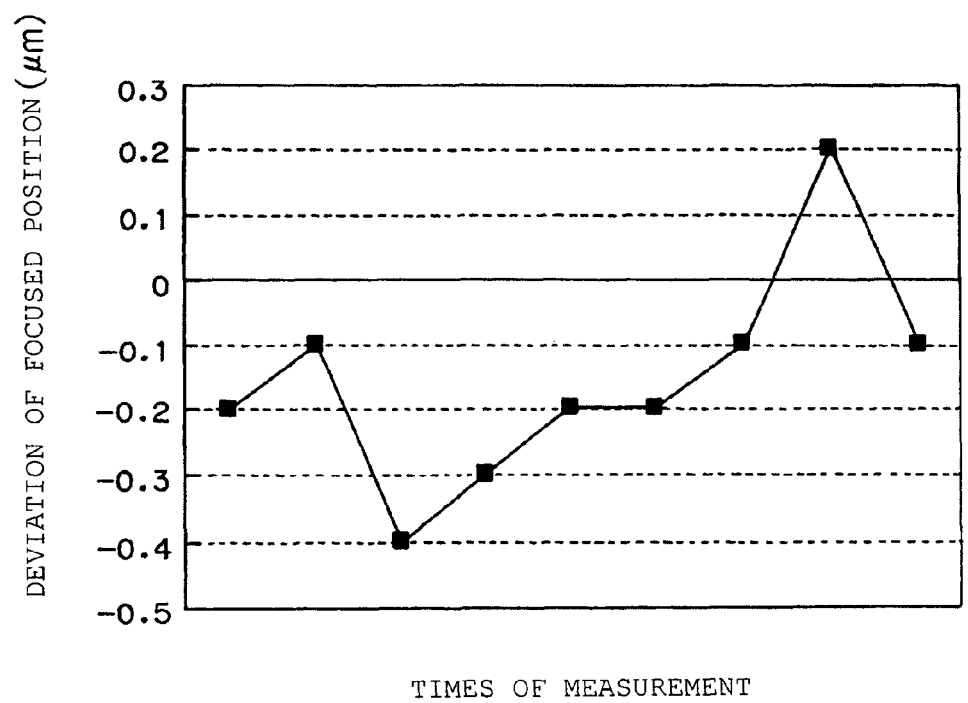
FIG. 8 is a graph showing a result of the basic experiment (Example 2)

The focusing evaluation value fluctuates as shown in FIG. 6, as the measurement surface 34 moves. In a section A close to the peak, as shown in FIG. 7, a finely vibrating fluctuation is observed, and hence it is difficult to accurately determine the peak position from a maximum value of the focusing evaluation value, in the section close to the peak position which is generally gently sloped. Applying the reference curve of a range wider than the section close to the peak position enables obtaining the focused position with an accuracy level of 1 μm or finer.

Figure 10:
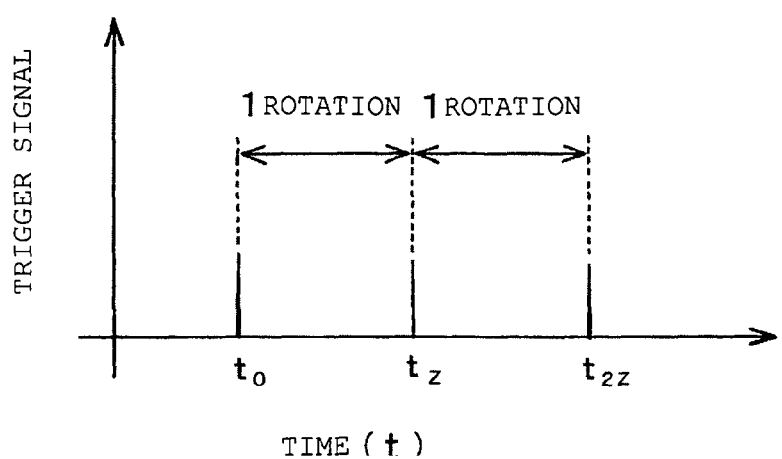
FIG. 10 is a diagram for explaining a trigger signal (Example 3)
Figure 11:
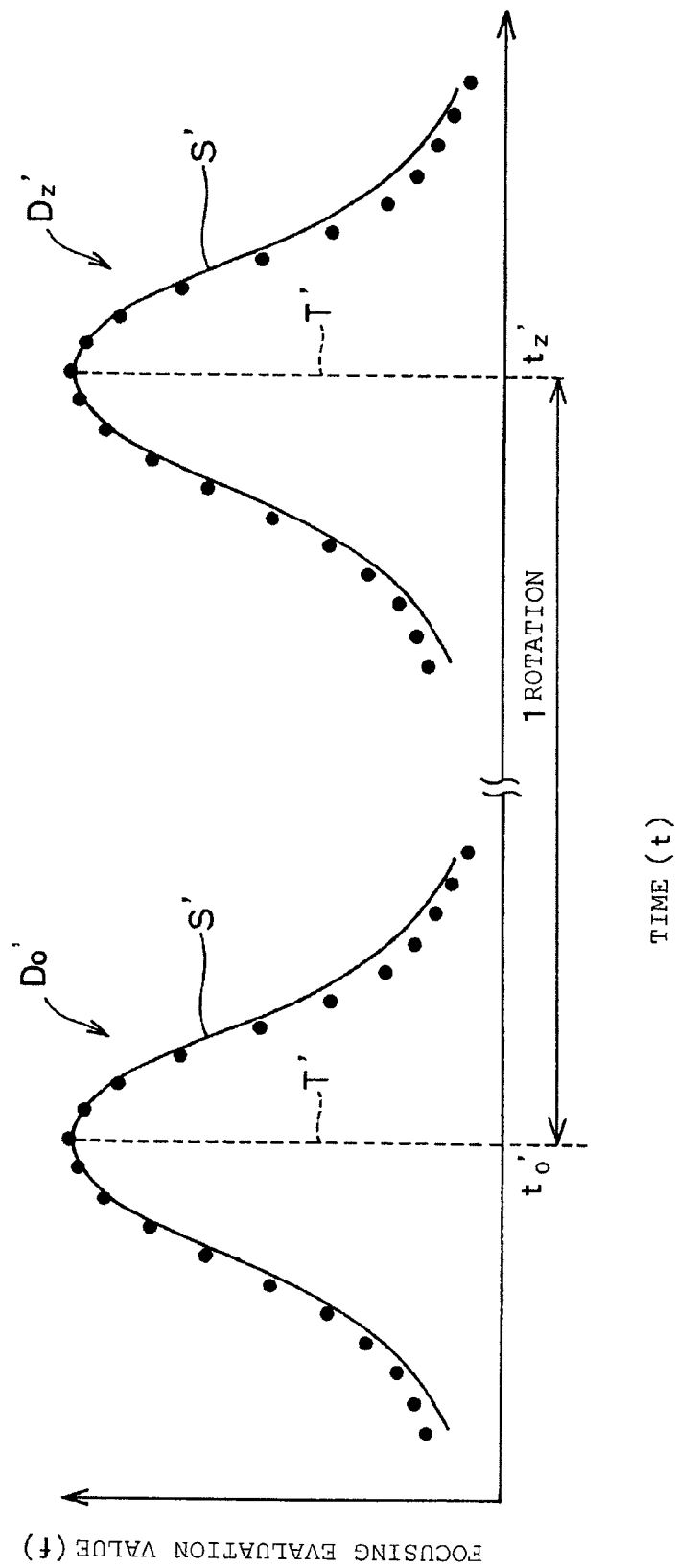
FIG. 11 is a graph for explaining application of a reference curve (Example 3)
Figure 12:
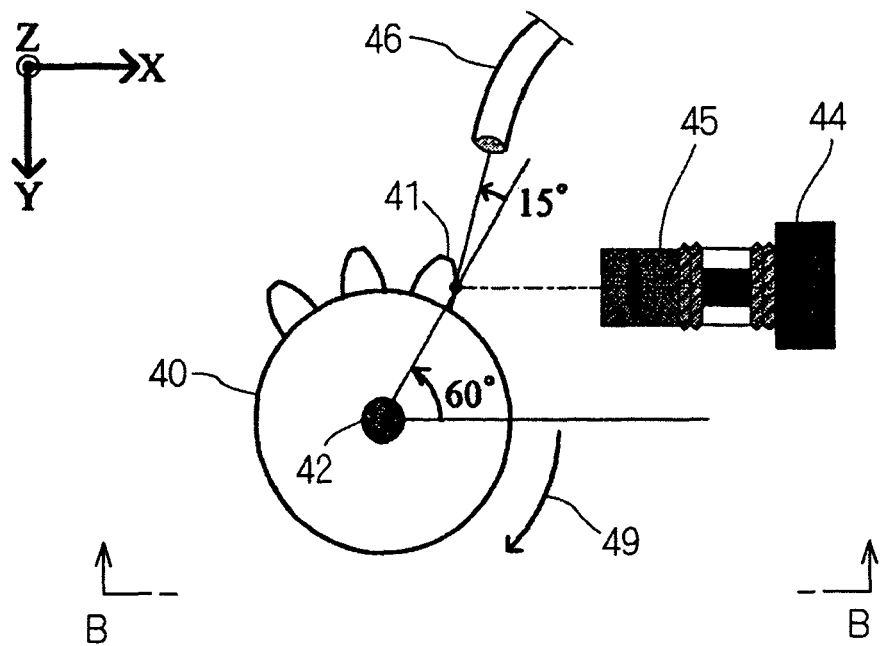
FIGS. 12(*a*) and 12(*b*) are illustrations for explaining a gear teeth pitch measurement (Example 4)
Figure 12:
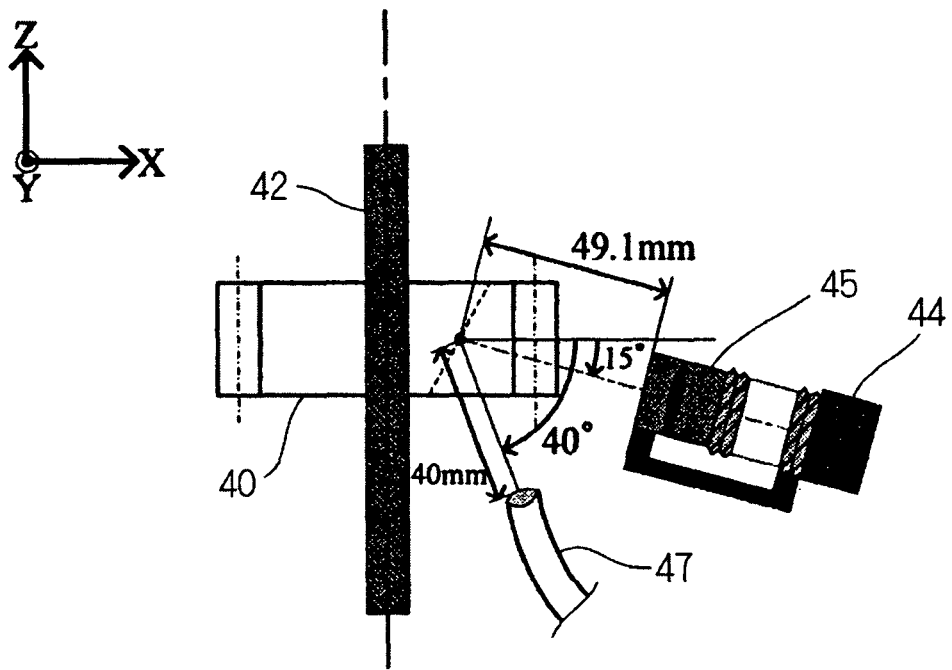

A pitch measurement system 11 according to a Example 3 will now be described, referring to FIG. 9 to FIG. 11. In the Example 3, the pitch measurement method is similar to Example 1. Hereunder, differences from the Example 1 will be primarily described, and the same components will be given the same numerals.

Figure 9:
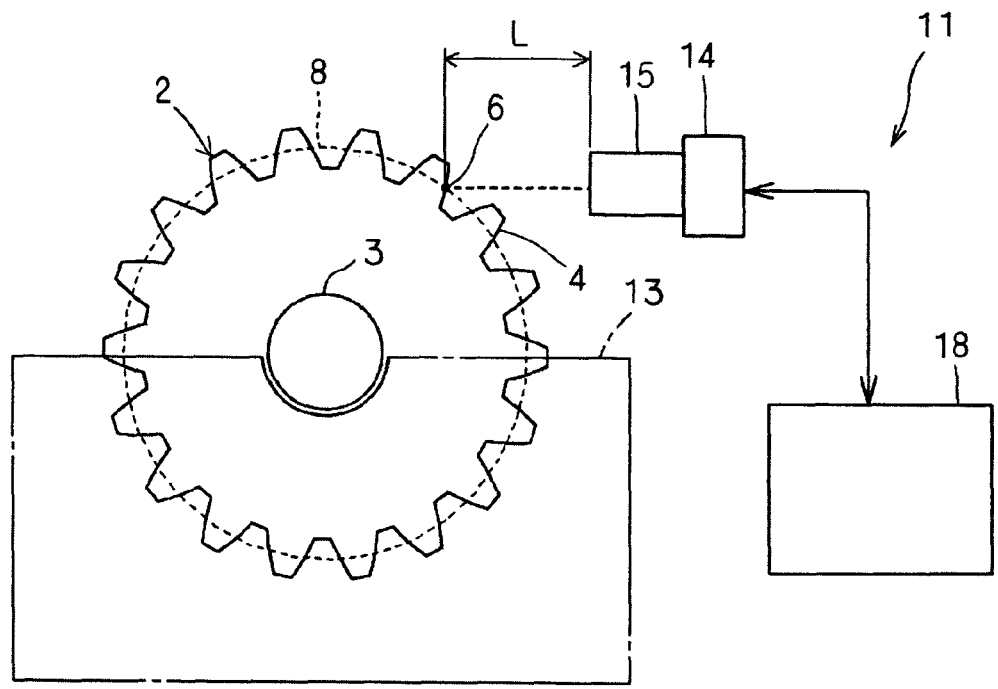
FIG. 9 is a schematic diagram of a pitch measurement system (Example 3)

As shown in FIG. 9, the gear 2 is rotatably retained by a retaining unit 13. An external force is applied to the gear 2 by an appropriate method to rotate the gear 2, and the external force is stopped. Then the camera 14 shoots images as in the Example 1, while the gear 2 naturally rotates.

The main unit of the measurement device 18 stores therein the data received from the camera 14 in association with the time of an internal clock. The main unit of the measurement device 18 calculates the rotation angle of the gear 2 from the time of the internal clock, and applies the reference curve to the point group of the combinations of the focusing evaluation value and the rotation angle thereby obtaining the pitch from the focused position, as in Example 1.

The rotation angle θ of the gear 2 can be obtained from the time, based on the motion equation of the naturally rotating gear 2. Specifically, the motion equation of the naturally rotating gear 2 may be expressed as below:

$$I\ddot{\theta}+D\dot{\theta}=0 \quad \text{[Formula 1]}$$

Here, I and D are constants.

The formula (1) is a second order differential equation, which allows determining a function θ(t), for example, from the time $t_0$, $t_Z$, $t_{2Z}$, corresponding to each rotation of a gear having Z pieces of teeth. For example, the gear 2 can naturally rotate very smoothly when pivotally supported by a static gas bearing, in which case the function θ(t) can be accurately determined.

The function θ(t) not only provides a method of solving the motion equation, but also allows obtaining, for example, a rotation angle at a given time from the time corresponding to each rotation, by approximating by a curve the relationship between the rotation angle and the time.

The time $t_0$, $t_Z$, $t_{2Z}$ can be measured, for example, by placing a detection mark on the gear 2 and detecting the detection mark with an optical sensor in a noncontact way.

It is also possible to measure the time $t_0$, $t_Z$, $t_{2Z}$ by utilizing the data acquired by the camera 14. For example, as shown in FIG. 11, the time t of the internal clock may be employed instead of the rotation angle θ of the gear, as in the case of Example 1, to thereby apply the reference curve S' to the point group $D_0'$ of the combinations of the time t of a reference tooth and the focusing evaluation value f, and to the point group $D_Z'$ with respect to the same tooth after one rotation, thus obtaining the time $t_0$, $t_Z$, corresponding to the reference axis T'.

The pitch measurement system 11 does not require a driving mechanism that rotates the gear 2 at a constant velocity, and hence the structure can be simplified.

Now, examples of the gear teeth pitch measurement (Example 4) will be described referring to FIG. 12 to FIG. 17.

As shown in FIGS. 12(a) and 12(b), a shaft 42 to which a gear to be measured 40 is attached is mounted on a center shaft of a gear measurement device (not shown), and the teeth surface is measured by a camera 44. The camera 44 is located, with the focus adjusted at a central portion of the surface of a reference tooth 41. Also, light guides 46, 47 are employed to illuminate the surface of the reference tooth 41 from a generally radial direction and generally in a thicknesswise direction of the gear 40.

The specification of the gear to be measured 40 is as follows.

Module: 2
Pressure angle: 20°
Helix angle: L30°
Number of teeth: 40
Tooth width: 20 mm
Pitch circle diameter: 92.376 mm
It is to be noted that the gear to be measured 40 is manufactured so that the position of one of the teeth of the gear to be measured 40 is intentionally shifted.

For measurement, the gear to be measured 40 is rotated by the gear measurement device as indicated by an arrow 49, during which the camera 44 shoots images at every 0.01° and the focusing evaluation value is calculated from the image data to thereby obtain the pitch.

More specifically, the luminance of R (red), G (green), B (blue) is substituted with a numerical value of 0 to 255, with respect to 64×64 pixels corresponding to the center of the tooth surface at which the focus is adjusted, out of the image data of the color bit map format. The contrast of a bright part and a dark part is considered to become stronger when the image is more sharply focused, and therefore the numerical expression of the contrast is employed as the focusing evaluation value.

Figures 15, 16, 17:
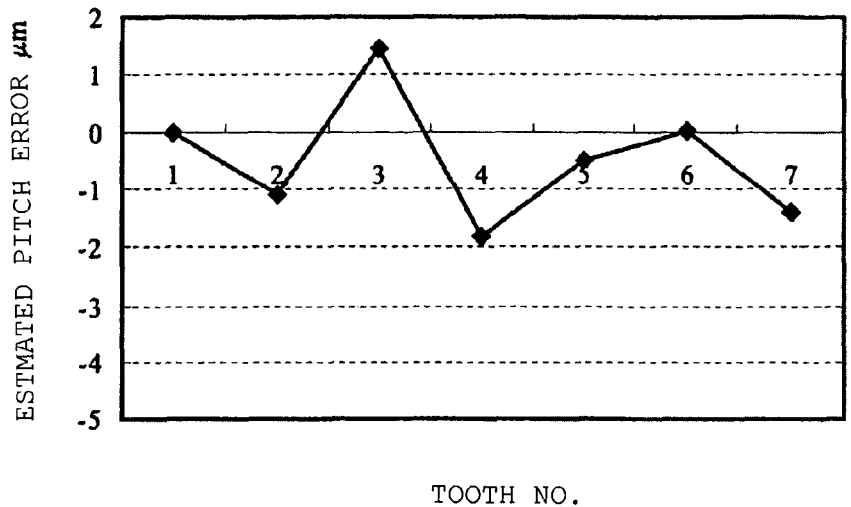
FIG. 15 is a graph of estimated pitch errors (Example 4)
FIG. 16 is a diagram for explaining a Laplacian filter (Example 4)
FIGS. 17(*a*) and 17(*b*) are diagrams for explaining a Prewitt filter (Example 4)

For example, as shown in FIG. 16, an 8-direction Laplacian filter, which is a second order differential filter, is employed. Specifically, upper, lower, left and right nine pixel values with the target pixel located at the center are respectively multiplied by a coefficient and summed, and the absolute value is obtained. Absolute values are similarly obtained with respect to all the pixels in the range to be analyzed (64×64 pixels), and after aggregating such absolute values the total is divided by the area of the range to be analyzed, thus to obtain the average $\Delta f$ of the absolute values. The average values $\Delta f^R$, $\Delta f^G$, $\Delta f^B$ of the absolute values are calculated with respect to each of R (red), G (green), B (blue), which are respectively multiplied by luminance contribution rates (rate that the three primary colors RGB contribute to the total luminance) $c^R$, $c^G$, $c^B$ and summed as expressed below:

$$f = c^R \cdot \Delta f^R + c^G \cdot \Delta f^G + c^B \cdot \Delta f^B$$

and this value is taken as the focusing evaluation value of the image.

Alternatively, a Prewitt filter, which is a first order differential filter, may be employed. In this case, as with the 8-direction Laplacian filter, upper, lower, left and right nine pixel values with the target pixel located at the center are multiplied by a coefficient shown in FIG. 17(a) in a horizontal direction and by a coefficient shown in FIG. 17(b) in a vertical direction, and a horizontal differential value $f_x$ and a vertical differential value $f_y$ are obtained, and then the sum of squares of the absolute value $(f_x^2 + f_y^2)^{1/2}$ is obtained. The sums of squares of the absolute values are similarly obtained with respect to all the pixels in the range to be analyzed (64×64 pixels), and after aggregating such sums of squares of the absolute values the total is divided by the area of the range to be analyzed, thus to obtain the average $\Delta f$ of the sum of squares of the absolute values. The average values $\Delta f^R$, $\Delta f^G$, $\Delta f^B$ of the sums of squares of the absolute value are calculated with respect to each of R (red), G (green), B (blue), which are respectively multiplied by the luminance contribution rates $c^R$, $c^G$, $c^B$ and summed as expressed below:

$$f = c^R \cdot \Delta f^R + c^G \cdot \Delta f^G + c^B \cdot \Delta f^B$$

and this value is taken as the focusing evaluation value of the image.

Figure 13:
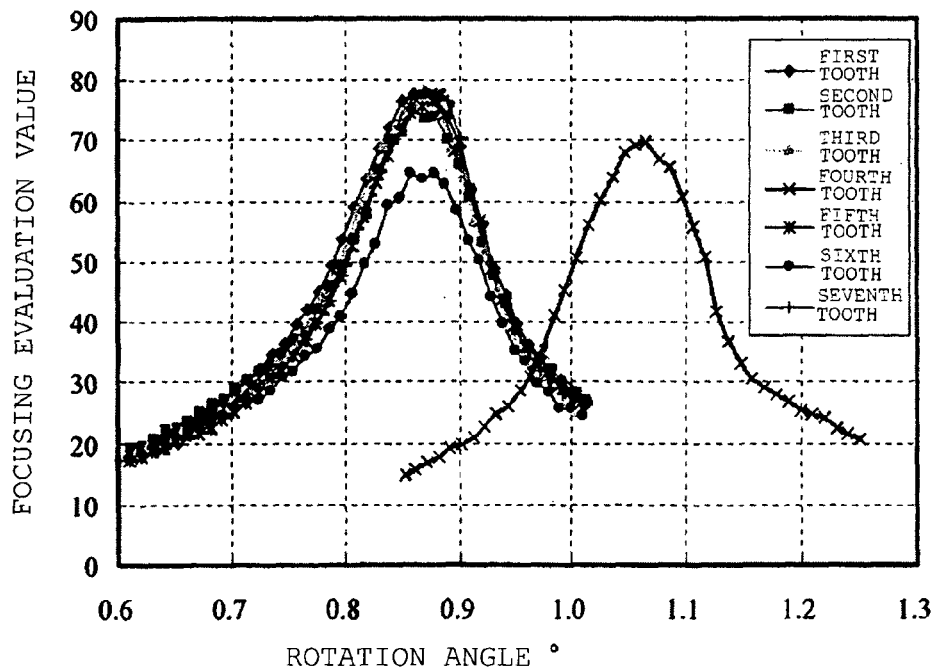
FIG. 13 is a graph of focusing evaluation values (Example 4)

FIG. 13 shows a relationship between the rotation angle of the gear and the focusing evaluation values. The teeth of the gear to be measured were numbered as a first tooth, a second tooth, a third tooth, . . . and the focusing evaluation value was calculated with respect to seven consecutive teeth. The rotation angle (horizontal axis) of the focusing evaluation value curve of each tooth represents a rotation angle obtained by subtracting the theoretical angle between the target tooth and the first tooth. In other words, the rotation angle of the n-th tooth represents a rotation angle determined by subtracting the theoretical pitch (9° in this example) multiplied by (n−1). For the focusing evaluation value, the 8-direction Laplacian filter of FIG. 16 was employed, and the luminance contribution rates were set as $c^R$=0.299, $c^G$=0.587, and $c^B$=0.114. FIG. 13 indicates, with respect to all the teeth, curves representing such fluctuation that the focusing evaluation value increases along with the rotation of the gear and decreases after a maximum value. The height and shape of the focusing evaluation value curve are different among each of the teeth. It is understood that the fourth tooth in particular has a remarkable pitch error.

Figure 14:
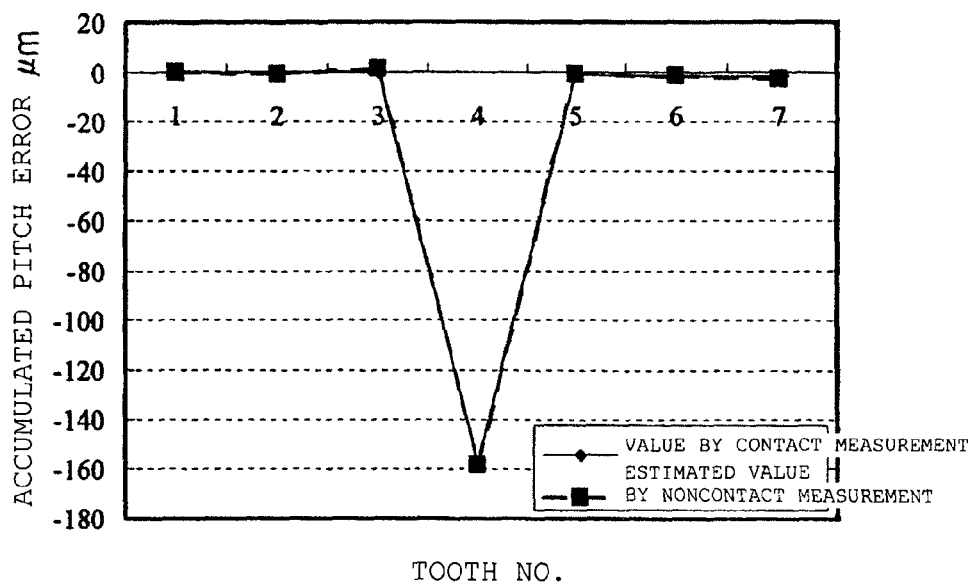
FIG. 14 is a graph of accumulated pitch errors (Example 4)

The interpolating curve of the focusing evaluation value of the first tooth was adopted as the reference curve and the reference curve was applied to the second to the seventh teeth, to thereby obtain an accumulated pitch based on the position where the reference curve was applied. The value determined by subtracting the theoretical pitch from the accumulated pitch was taken as the accumulated pitch error. As a comparative example, the vicinity of the photographed position of the teeth of the gear to be measured 40 was measured by a contact type measurement device. FIG. 14 shows the estimated values of the accumulated pitch errors and the measurement values obtained by the contact type measurement device.

With respect to each tooth measured, the measurement value obtained by the contact type measurement device was subtracted from the estimated values of the accumulated pitch error obtained by the noncontact measurement, and the difference was taken as the estimated pitch error. Such values are shown in FIG. 15. With respect to the first to the seventh teeth, the standard deviation of the estimated pitch error was worked out as 1.0 μm. This proves that the noncontact type measurement with the camera 44 provides similar accuracy to the contact type measurement, in the pitch measurement.

Referring now to FIGS. 18(a) and 18(b), description will be given on the pitch measurement of a linearly moving object (Example 5).

FIG. 18(a) is a diagram for explaining a pitch measurement of V-grooves 51 of a V-groove substrate 50 of an optical fiber array. FIG. 18(b) is a cross-sectional view taken along the line B-B in FIG. 18(a).

As shown in FIG. 18(a), the V-groove substrate 50 is placed on a slide table 52 with the surface with the V-grooves 51 facing upward, and a camera 54 shoots the V-grooves 51 of the V-groove substrate 50 from an upper fixed position, while the V-groove substrate 50 is linearly moved in a direction perpendicular to an extending direction of the V-grooves as indicated by an arrow 53. The V-groove substrate 50 may be linearly moved diagonally with respect to the extending direction of the V-grooves 51, in which case the groove pitch in the direction of that linear motion can be measured. In this process, the camera 54 may shoot images either from a direction of the normal of the main surface of the V-groove substrate 50 as indicated by an arrow 54a, or from a diagonal direction, i.e. from a direction of the normal of the sloped surface of the V-grooves 51, as indicated by an arrow 54x.

The photoshooting is performed with the focus adjusted at the center of the slope 55 of the V-groove 51 of the V-groove substrate 50. Also, as shown in FIG. 18(*b*), light guides 57, 58 may be employed to illuminate the vicinity of the center of the slope 55 of the V-groove 51 of the V-groove substrate 50 which is focused, from directions 57*a*, 58*a* which are generally the same as the shooting direction 54*a*.

For measurement, a main unit of the measurement device 56 controls so as to drive the slide table 52 thus to linearly move the V-groove substrate 50, during which the linear movement distance is measured, and the camera 54 shoots images synchronized with the measurement. The main unit of the measurement device 56 extracts data of a predetermined focused range out of the image data from the camera 54 and calculates the focusing evaluation value, and applies the reference curve to the point group indicating the correspondence of the focusing evaluation value and the linear movement distance, to thereby calculate the pitch of the V-grooves 51.

Figure 18:
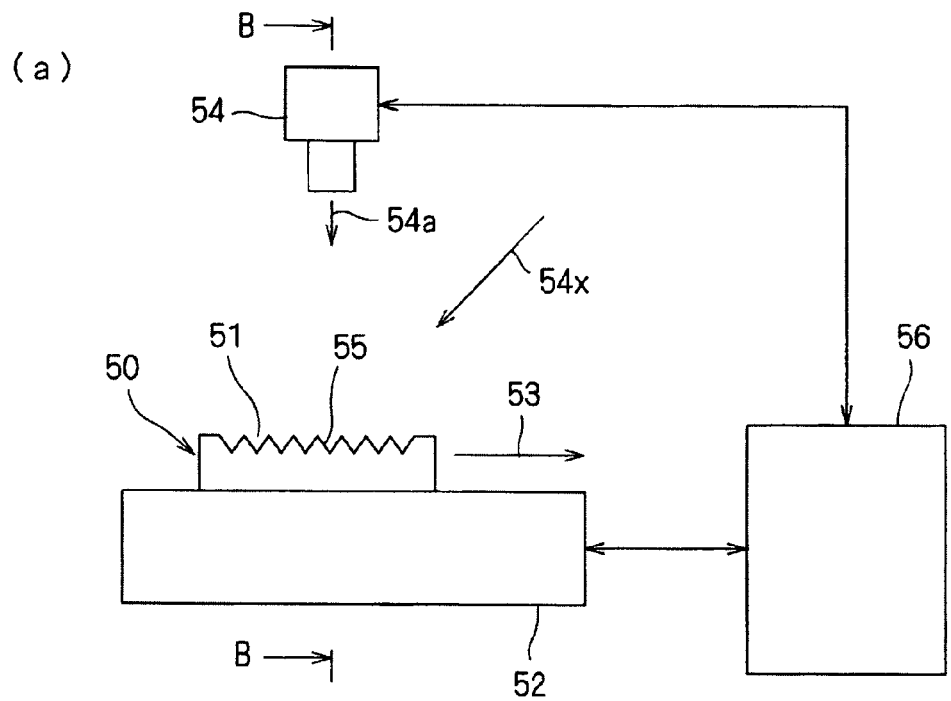
FIGS. 18(*a*) and 18(*b*) are schematic diagrams of a pitch measurement system (Example 5).
Figure 18:
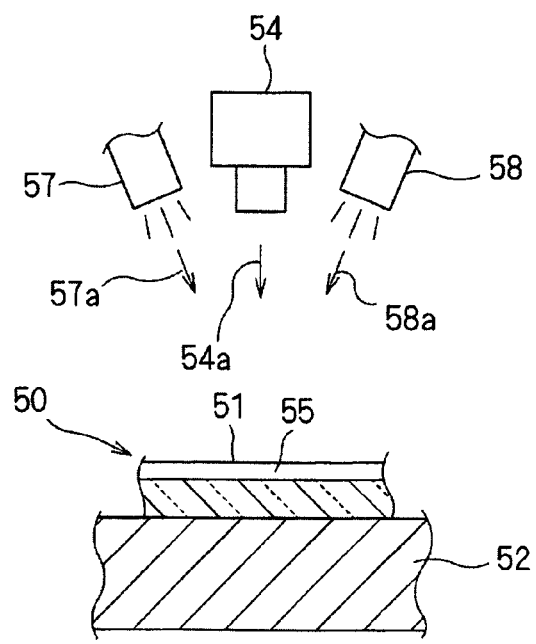

Measurement of a pitch of a light guide plate or reflection plate for a back light of an LCD panel, a micro lens array pitch, a screw pitch, a rack pitch and so forth may be performed with a system similar to those shown in FIGS. 18(*a*) and 18(*b*). In addition, a pitch of a die for manufacturing these items can also be measured.

As described above, the foregoing system allows performing a noncontact measurement with high accuracy in a short period of time, with a simple device.

It is to be understood that the present invention is not limited to the foregoing examples, but may be embodied with various modifications.

For example, although the gear is referred to the present invention is not limited to the gear pitch measurement. The present invention can also be applied to pitch measurement of a screw and the like. The present invention can further be applied to an object with the shape-of-interest portions formed in different pitches (for example, a cutaway portion), or with the shape-of-interest portion linearly formed (for example, a rack).

Also, the acquisition and storage of the data and the analysis of the data (calculation of the pitch) may be executed by separate units. In this case, the latter device which executes the data analysis (for example, a computer) may execute, according to a predetermined program, a first step of moving an object having a plurality of shape-of-interest portions of generally the same shape such that the shape-of-interest portions move along the same path, and accepting an input of optical data (for example, data of shot images of the predetermined position) of the shape-of-interest portion passing a predetermined position on the path from a fixed position, successively acquired focusing on the predetermined point; a second step of calculating a focusing evaluation value, representing the numerical focusing degree at the area corresponding to the predetermined position, using the movement distance as a variable, according to the correspondence relationship between the optical data accepted at the first step and a movement distance of the shape-of-interest portion of the object, and obtaining a point group of combinations of the movement distance and the focusing evaluation value; and a third step of applying a reference curve to the point group, thereby determining the pitch based on the position where the reference curve is applied.

Also, associating the movement distance of the object with the data of the shot images enables applying the reference curve to the point group of the focusing evaluation value, and therefore it is not mandatory to rotate the object at constant velocity or shoot the images at regular intervals.

The photoshooting method and the focusing evaluation value may be appropriately selected according to the nature of the surface of the object. For example, the focusing evaluation value can be calculated from the data of the shot images, according to an active or passive ranging method employed in cameras and sensors. The photoshooting may be simply executed with a single optical system, to thereby obtain the focusing evaluation value from the fluctuation in luminance. Otherwise, the photoshooting may be performed with two optical systems having parallel optical axes, to thereby calculate the focusing evaluation value from a difference in luminance peak position (parallax) between the formed images of the respective optical systems.

Also, employing a predetermined position other than the peak position, such as a middle point that equally divides the width of the reference curve in two, an inflection point of the reference curve, an initial point or terminal point of the reference curve, for defining the position to apply the reference curve, results substantially the same as employing the peak position as the position to apply the reference curve. Also, the focusing evaluation value may be defined such that the minimum point corresponds to the focused position. In this case, although the protrusion and recession of the reference curve are reversed, applying the reference curve to the point group of the focusing evaluation value can lead to obtaining the pitch, as in the case where a maximum point corresponds to the focused position.

The invention claimed is:

1. A pitch measurement method of performing noncontact measurement of a distance between target points of adjacent shape-of-interest portions, which defines a pitch of the shape-of-interest portions, with respect to an object having a plurality of shape-of-interest portions of a substantially same shape, comprising:

a first step of moving the object such that the shape-of-interest portions move along a same path;

a second step of continuously acquiring and storing optical data of the shape-of-interest portion passing a predetermined position on the path from a fixed position, focusing on the predetermined position;

a third step of calculating a focusing evaluation value, representing a numerical focusing degree at an area corresponding to the predetermined position, using a movement distance of the shape-of-interest portion of the object as a variable, according to a relationship between stored optical data and the movement distance, and obtaining a point group of combinations of the movement distance and the focusing evaluation value; and a fourth step of applying a reference curve to the point group, so as to determine the pitch based on a position where the reference curve is applied.

2. The pitch measurement method according to claim 1, wherein the third step includes determining the reference curve based on the focusing evaluation value obtained before and after at least one of the shape-of-interest portions passes the predetermined position on the path.

3. The pitch measurement method according to claim 2, wherein the reference curve is a curve including a section between at least one extreme value and inflection points located on respective sides thereof.

4. The pitch measurement method according to claim 1, wherein the reference curve is a curve including a section between at least one extreme value and inflection points located on respective sides thereof.

5. The pitch measurement method according to claim 1, wherein the first step includes moving the object at a substantially constant velocity; and the second step includes acquiring and storing the optical data at substantially constant intervals.

6. The pitch measurement method according to claim 5, wherein the third step includes determining the reference curve based on the focusing evaluation value obtained before and after at least one of the shape-of-interest portions passes the predetermined position on the path.

7. The pitch measurement method according to claim 6, wherein the reference curve is a curve including a section between at least one extreme value and inflection points located on respective sides thereof.

8. The pitch measurement method according to claim 5, wherein the reference curve is a curve including a section between at least one extreme value and inflection points located on respective sides thereof.

9. A pitch calculation method of calculating a distance between target points of adjacent shape-of-interest portions, which defines a pitch of the shape-of-interest portions, with respect to an object having a plurality of shape-of-interest portions of a substantially same shape, comprising:

a first step of moving the object such that the shape-of-interest portions move along a same path, and accepting an input of optical data of the shape-of-interest portion passing a predetermined position on the path from a fixed position, successively acquired focusing on the predetermined position;

a second step of calculating a focusing evaluation value, representing a numerical focusing degree at an area corresponding to the predetermined position, using a movement distance of the shape-of-interest portion of the object as a variable, according to a relationship between the optical data accepted at the first step and the a movement distance, and obtaining a point group of combinations of the movement distance and the focusing evaluation value; and a third step of applying a reference curve to the point group, thereby determining the pitch based on a position where the reference curve is applied.

10. A computer readable medium encoded with a program that causes a computer to calculate a distance between target points of adjacent shape-of-interest portions, which defines a pitch of the shape-of-interest portions, with respect to an object having a plurality of shape-of-interest portions of a substantially same shape, causing the computer to execute, comprising:

a first step of moving the object such that the shape-of-interest portions move along a same path, and accepting an input of optical data of the shape-of-interest portion passing a predetermined position on the path from a fixed position, successively acquired focusing on the predetermined position;

a second step of calculating a focusing evaluation value, representing a numerical focusing degree at an area corresponding to the predetermined position, using a movement distance of the shape-of-interest portion of the object as a variable, according to a relationship between the optical data accepted at the first step and the movement distance, and obtaining a point group of combinations of the movement distance and the focusing evaluation value; and a third step of applying a reference curve to the point group, thereby determining the pitch based on a position where the reference curve is applied.

11. A pitch measurement device that performs noncontact measurement of a distance between target points of adjacent shape-of-interest portions, which defines a pitch of the shape-of-interest portions, with respect to an object having a plurality of shape-of-interest portions of a substantially same shape, comprising:

a data acquisition unit that successively acquires and stores, when the object is moved such that the shape-of-interest portions move along a same path, optical data of the shape-of-interest portion passing a predetermined position on the path from a fixed position, focusing on the predetermined position; and a pitch calculation unit that calculates a focusing evaluation value, representing a numerical focusing degree at an area corresponding to the predetermined position, using a movement distance of the shape-of-interest portion of the object as a variable, according to a relationship between stored optical data and the movement distance, obtains a point group of combinations of the movement distance and the focusing evaluation value, and applies a reference curve to the point group, thereby determining the pitch based on a position where the reference curve is applied.

12. The pitch measurement device according to claim 11, wherein the data acquisition unit stores the optical data acquired from free movement of the object in association with a time that the optical data is acquired; and the pitch calculation unit determines a focused position based on the optical data acquired by the data acquisition unit and a time associated with the optical data.

* * * * *